3,343,370
EARTH EMBANKMENT WITH INTERNAL WATER BARRIER

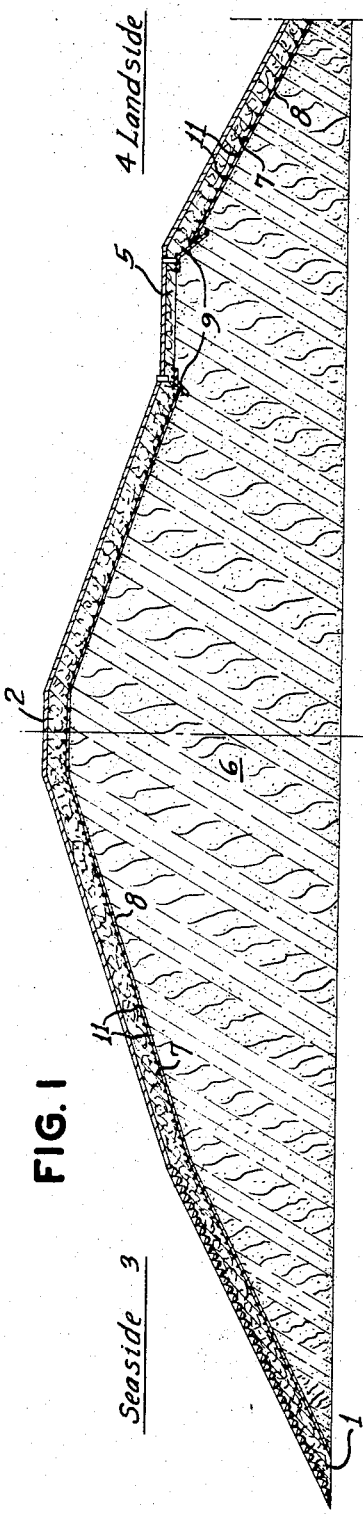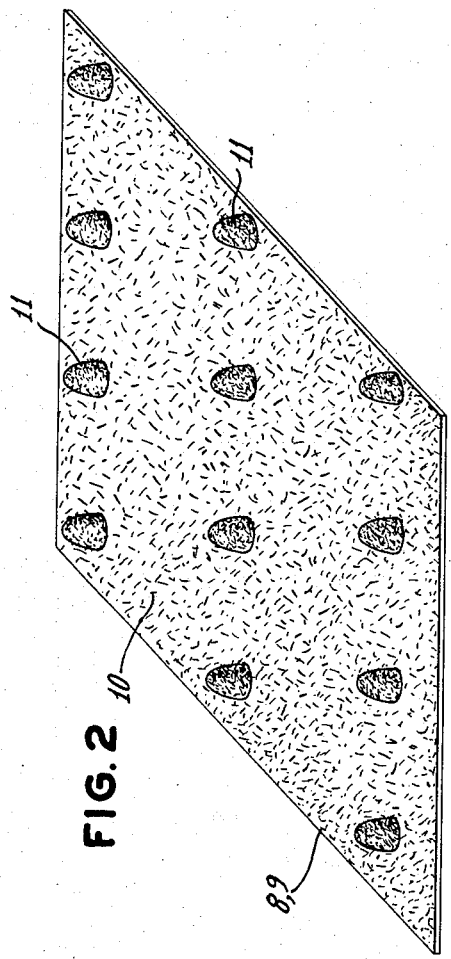
INVENTORS
Günther Twele and
Karl Helmut Rothaug, deceased,
(by Johanne Helgard Rothaug,
née Werner, on behalf of
herself and Ulrike Ismene
Rothaug and Gudrun
Rothaug, heirs)

Gunther Twele, Weisbaden, Germany, and Karl Helmut Rothaug, deceased, late of Weisbaden-Biebrich, Germany, by Johanne Helgard Rothaug, nee Werner, heir and legal representative of minor heirs, Wiesbaden-Biebrich, Germany, assignors to Kalle Aktiengesellschaft, Wiesbaden-Biebrich, Germany, a corporation of Germany
Filed Oct. 16, 1963, Ser. No. 317,111
Claims priority, application Germany, Oct. 18, 1962, K 48,012
3 Claims. (Cl. 61—31)

The present invention is concerned with a process for building banks of earth, in which plastic films are utilized as insulating intermediate layers, in particular for building embankments in road and railroad construction and dikes for river channel or coast line improvement.

It has already been suggested to use plastic films as insulating intermediate layers in the construction of earth dams. The present invention provides a process which causes, in addition to said insulating effect, an improved adhesion of the soil heaped on the insulating film.

According to the present invention, in the building of banks of earth having a plastic film interposed between two portions of the bank in an inclined arrangement for the purpose of insulation against the penetration of water, a thermoplastic film is interposed between said two portions at least one surface of which is provided with a sharp-edged, small particle size material which is firmly anchored to the supporting film.

The sharp-edged, small particle size material applied to the sheet material to be used according to the present invention may consist of any solid inorganic or organic material which can be firmly anchored to the supporting film and is capable of withstanding the corrosive action of the soil. The following materials are principally suited: chopped, granulated or powdered plastic materials, pulverized or granulated mineral substances, e.g. sharp-edged sand, or metal particles, such as scrap or wire pieces of a preferably non-corrosive metal.

Small particle size materials according to the present invention are such materials which pass a screen having square meshes of an inside width at 5 mm. Preferably, a material is used which passes a screen having meshes of a diameter of 2 mm. The sharp-edged, small particle size material may be of a very small particle size, provided it protrudes sufficiently from the surface of the thermoplastic supporting film so that, e.g., sand sprinkled thereon will not slide off of the film at an angle smaller than the angle of repose of deposited sand. Moreover, the small particle size material must be of a surface structure having edges which are more or less sharp.

The supporting film consists of a thermoplastic material. Supporting films consisting of olefin polymers or of mixtures of olefin polymers, further films of vinyl chloride polymers or of mixtures of such polymers, have proved very suitable. Preference is given to films made of various polyethylenes, particularly of polyethylene having a density ranging from 0.940 to 0.963, i.e. so-called low-pressure polyethylene, as well as films of polypropylene or unplasticized polyvinyl chloride. In addition to other qualities, they have the advantage that the small particle size material may be anchored to their surfaces in a relatively simple manner. The thickness of the film is not critical. Generally, it will be in the range from 0.2 to 2.0 mm. In most cases, supporting films of a thickness between 0.5 and 1.5 mm. will be preferred for reasons of economy and because such films are sufficiently flexible to adapt themselves easily to the subsoil.

The sharp-edge, small particle size material may be attached to the supporting film in any desired manner, e.g. by sintering, by fusing, or by gluing, if desired in combination with pressing in.

Sheet covers, in which, according to the invention, the sharp-edged, small particle size material consists of the same material as the supporting film or of a related material which may easily be welded to the film material and is attached thereto by fusing or sintering have proved to be of particular advantage because, due to the homogeneity of the material, it exhibits a uniform behavior towards chemical and mechanical influences, so that the bond between the supporting film and the small particle size material fused or sintered thereto is considerably more resistant to the temperature variations and other stresses acting on it when used in banks of earth.

Preferably, the small, sharp-edged particles should cover the supporting film in such a way that the individual particles are arranged besides each other, but not on top of each other on the supporting film. However, the average distance of the individual particles from each other should, generally, be not greater than the size of the largest particles present.

Further, it has proved to be of advantage if the sheet material to be used according to the invention is additionally provided with protuberances. These may be produced by a thermoforming process, i.e. by deep-drawing of the film under the influence of heat. The material is subjected to the deforming process preferably after the surface of the supporting film has been provided with the small, sharp-edged particles. Films according to the invention which have been deformed in this manner not only afford a secure hold to slippery material heaped thereon, but also form hollow spaces which in some cases are desirable, for instance because they impart a certain elasticity to the layers of soil, concrete or the like applied directly or indirectly on the films.

The sheet material of the present invention may be produced in a very simple manner. For instance, the sharp-edged, small particle size material may be placed on the upper surface of a thermoplastic film and then combined with the surface by sintering, fusing or gluing, if desired with simultaneous pressing of the small particles into the softened support.

Preferably, such sharp-edged, small particle size material is used which can be easily fused to the supporting film. It is of particular advantage when the sharp-edged, small particle size material is placed on the supporting film immediately after the film has been calendered or extruded, i.e. while the film is still warm or even plastic, and then allowed to sinter into the film. Alternatively, the sharp-edged, small particle size material may be forced into the supporting film by means of rolls. An improved sealing of the small particle size material to the supporting film may in some cases also be effected by heating the supporting film subsequent to the application of the material. Instead of the supporting film, or in addition thereto, the sharp-edged, small particle size material may be heated above the softening temperature of the supporting film and then applied thereto in the heated state.

Most suitable is a process in which subsequent to the formation of the film by extrusion of a thermoplastic olefin polymer, e.g. polyethylene or polypropylene or copolymers thereof or a mixture of such polymers, chips produced from a film consisting of the same plastic material as the extruded supporting film or of another plastic material which can be easily fused to the supporting film are sprinkled onto the extruded film-like sheet before it cools down to a temperature below the temperature range in which the extruded film is fusible. Thus, in a relatively simple manner, polyolefin polymer films with a very rough surface are produced, since the film chips shrink upon being fused to the extruded film and assume a sharp-edged shape.

Sharp-edged, small particle size materials which cannot be fused with the supporting film, e.g. sand or metal grits or scraps, are advantageously anchored to the supporting film by forcing them e.g. by means of rolls, into the supporting film soon after the film has been produced and as long as it is still in the plastic state, and then cooling the film below its softening point. Care must be taken that the sharp-edged, small particle size material is only partially pressed into the film, so that the individual particles protrude from the original surface of the supporting film. In this case, it is also possible to heat the sharp-edged, small particle size material above the softening point of the supporting material. This causes the supporting film to melt in those areas where the small particles have been applied so that, under suitable process conditions, the particles partially sink into the supporting film either by the pressure applied or merely by their own weight.

The process for the construction of banks of earth which is the object of the present invention is illustrated in the following example, with reference to the attached drawings. Of these, FIG. 1 shows a cross section of a sea dike and FIG. 2 shows a top view of a section of film used in the form of long webs.

During the construction of a sea dike of about 8 meters height, measured from the foot of the dike 1 to its summit 2, which on the slope facing the sea 3 and on the slope facing land 4 has an inclination of 1:3, a road 5 is built about half-way up the slope facing the land, which road may be used for defending the wall in an emergency. The dike consists of a core 6 consisting of deposited masses of soil or sand. On top of this core, there is a surface layer 7 of about 0.5 metre thickness of cohesive material, e.g. clay or loam. A plastic film 8 consisting of polyethylene of 1 mm. thickness is placed during the construction of the sea dike onto the dike core 6 before the surface layer 7 is superimposed thereon. Thus, the film has an inclination to the horizontal which corresponds to the angle of the slope of the dike, i.e. an inclination of 1:3. In the slope facing the land side 4, there is also embedded a 1 mm. thick polyethylene film at the boundary between slope and road 5, as can be seen from FIG. 1.

The polyethylene films 8 and 9 used for insulating the dike slopes are provided on one surface, which during the construction of the sea dike is placed upward, with sharp-edged, small particle size material 10 consisting of the same type of polyethylene and fused to the film. Moreover, the film is provided with elevations 11 shaped like small cones with rounded tops which have a diameter of 6 mm. at the basis and a height of 10 mm. and the centres of which have a distance of about 28 mm. from each other, as shown in FIG. 2.

The film used in the construction of the sea dike was produced, e.g., by continuously extruding polyethylene of a density of 0.941 from a slot die, so that a polyethylene web was obtained which originally was in the fluid state, i.e. capable of welding with itself, and which was continuously taken off. Before the extruded film had cooled to a temperature below the temperature range at which it is weldable, chips of a particle size not exceeding 5 mm. which had been cut from films of 30 to 100µ thickness, were sprinkled onto the upper surface of the film web. When the film chips sprinkled on the web surface touched the film surface, they fused to it and underwent some contraction, so that they obtained a very sharp-edged shape. In a manner known per se, the film with the sharp-edged, small particle size material applied thereto was provided in a vacuum deep-drawing process with elevations of the shape described above.

It will be obvious to those skilled in the art that many modifications may be made wtihin the scope of the present invention without departing from the spirit thereof, and the invention includes all such modifications.

What is claimed is:
1. An earth embankment having an internal barrier to prevent water penetration, comprising a water-impervious thermoplastic film extending in an inclined position within the embankment, said film separating the embankment into an upper portion and a lower portion and being in contact therewith, said thermoplastic film being directly supported on said lower portion and having anchored to at least the upper surface thereof a plurality of small solid particles, said particles being dispersed completely over the upper surface of said film and protruding into said upper portion to prevent slippage of said upper portion.
2. An embankment according to claim 1 in which the small solid particles are of a thermoplastic material which is easily weldable with said film.
3. An embankment according to claim 1 in which the small solid particles are of the same thermoplastic as the material constituting said film.

References Cited

UNITED STATES PATENTS

| | | | |
|---|---|---|---|
| 2,722,265 | 11/1955 | Kelly et al. | 264—39 |
| 2,761,177 | 9/1956 | Walters | 156—279 |
| 2,888,975 | 6/1959 | Benedict | 156—298 |
| 2,034,941 | 5/1962 | Hessenthaler et al. | 161—143 |
| 3,038,393 | 6/1962 | Nagin et al. | 94—9 |
| 3,152,002 | 10/1964 | Wisotzky | 117—21 |
| 3,188,814 | 6/1965 | Rettig | 61—31 |
| 3,219,507 | 11/1965 | Penman | 156—244 |

FOREIGN PATENTS 715,126    9/1954    Great Britain.

OTHER REFERENCES

Engineering News-Record, Nov. 9, 1944, pp. 4 and 5.

EARL J. WITMER, *Primary Examiner.*